Nov. 25, 1958      A. C. FIELDS      2,861,648

ELECTROSTATIC PRECIPITATORS

Filed April 30, 1956

Arnold C. Fields
INVENTOR
BY Robert J. Palmer
ATTORNEY

United States Patent Office 2,861,648
Patented Nov. 25, 1958

2,861,648

ELECTROSTATIC PRECIPITATORS

Arnold C. Fields, Medfield, Mass., assignor to Westinghouse Electric Corporation, East Pittsburgh, Pa., a corporation of Pennsylvania Application April 30, 1956, Serial No. 581,660

2 Claims. (Cl. 183—7)

This invention relates to electrostatic precipitators, and has as an object to simplify and reduce the cost of such precipitators.

An electrostatic precipitator which is widely used for cleaning air, has an ionizer consisting of fine wire discharge electrodes, and larger non-discharge ionizer electrodes, and has a collector consisting of alternately arranged, charged and grounded collector plates. For obtaining adequate ionization, a D. C. voltage of about 12 kv. is usually applied to the ionizer electrodes. A voltage of about 6 kv. is usually applied to the collector plates. The power pack for providing such voltages usually consists of a step-up transformer having two rectifiers connected to its secondary winding in a voltage-doubler circuit.

I have found that I can greatly reduce the cost of such precipitators by applying alternating current to the ionizer electrodes, and by using a single half-wave rectifier to supply direct current voltage to the collector plates, and to apply direct current voltage to the ionizer electrodes in such a manner that corona discharge can take place during alternate half-cycles only.

Figure 1:
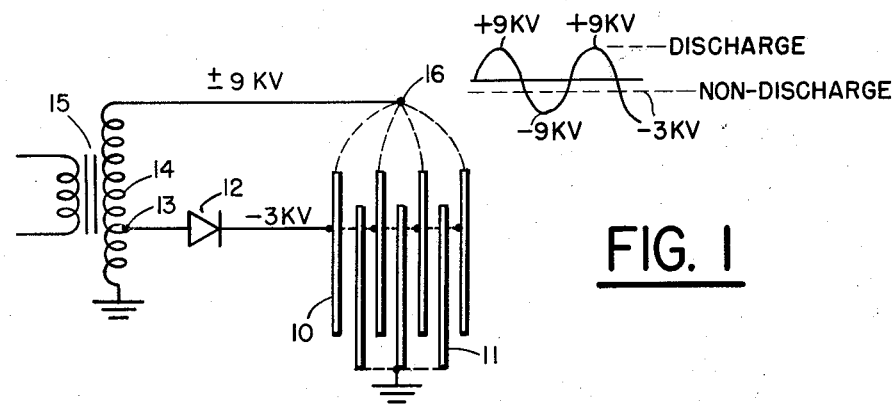
Figure 2:
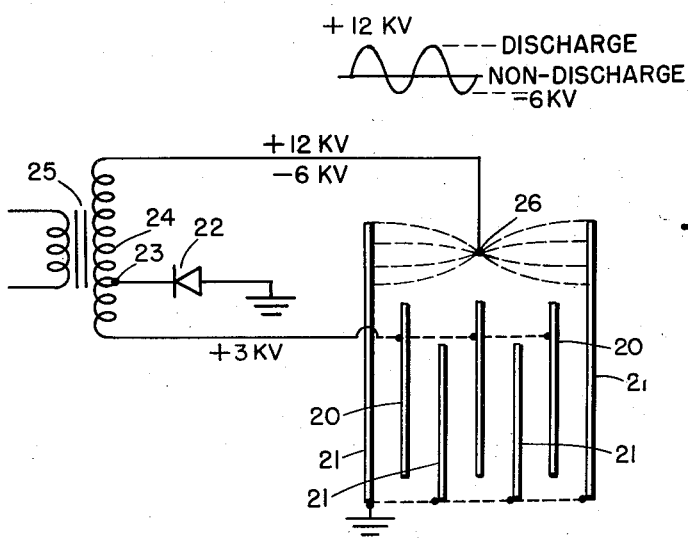

This invention will now be described with reference to the annexed drawings, of which:

Fig. 1 is a circuit schematic of one embodiment of this invention, showing also the wave form of the voltage at the ionizer electrodes, and Fig. 2 is a circuit schematic of another embodiment of this invention, showing also the wave form of the voltage at the ionizer electrodes.

Referring first to Fig. 1, plates 10 are charged collector plates, and plates 11 are grounded collector plates, the two sets of plates being arranged and supported as is conventional. The charged plates 10 are electrically connected together and to one side of a diode 12, the other side of which is connected to a tap 13 on the secondary winding 14 of a step-up transformer 15. The end of the winding 14 nearest the tap 13 is grounded, and its other end is connected to an ionizer wire 16 which is located upstream with respect to gas flow of the collector plates.

The upstream edges of the plates 10 extend nearer to the wire 16 than do the upstream edges of the plates 11, and form non-discharging ionizer electrodes.

An A. C. voltage of, for example, 9 kv. is developed across the winding 14 so that the ionizer wire 16 has an A. C. voltage of 9 kv. applied to it. The tap 13 is located about one-third of the way from the grounded end of the winding so that at the tap there is an A. C. voltage of 3 kv. The rectifier 12 is so poled that it delivers a negative D. C. voltage of about 3 kv. to the plates 10. The grounded end of the winding 14 is connected to the plates 10 through the capacitance of the plates 10 and 11.

The ionizer wire 16 is so spaced from the upstream edges of the plates 10 that a voltage difference between the wire and the plates 10 of about 12 kv. is required for a corona discharge. During alternate half-cycles the wire is +9 kv. while the plates are −3 kv. so that there is a voltage difference of 12 kv., and corona discharge can take place. During the other half-cycles the wire is −9 kv. and the plates 10 are −3 kv., the difference being 6 kv., too low to provide a corona discharge.

Air passing the wire 16 is ionized during positive half-cycles, and the dust particles in the air are given positive electrostatic charges. The charged dust deposits upon the oppositely charged plates 10.

In the embodiment of Fig. 2, the end ones of grounded plates 21 extend upstream past an ionizer wire 26, and form non-discharging ionizer electrodes. Charged plates 20 are connected to one end of the secondary winding 24 of a step-up transformer 25. A tap 23 on the winding 24 is connected to one end of a diode 22, the other end of which is grounded. The other end of the winding 24 is connected to the ionizer wire 26. An A. C. voltage of about 9 kv. is developed across the winding 24. The tap 23 is so located, and the diode 22 is so poled that the end of the winding 24 which is connected to the plates 20 charges the latter to +3 kv.

During a negative half-cycle, the rectifier 22 conducts and connects the tap 23 to ground. The ionizer wire 26 would be −6 kv. The plates 20 are +3 kv. The capacitance of the plates 20 and 21 is charged to 3 kv. The voltage difference of 6 kv. between the ionizer wire and the non-discharging ionizer electrodes is insufficient to produce corona at the wire.

During the next half-cycle, ground is removed from the tap 23. The end of the winding 24 connected to the plates 20 is +3 kv. because of the charge in the plate capacitance through which the bottom end of the winding 24 is now connected to ground. The plate capacitance is in series with the winding 24 so that +9 kv. added to +3 kv. provides +12 kv. at the ionizer wire. This is sufficient to produce corona at the wire.

In the operation of Fig. 2, the air passing through the ionizer is ionized during the positive half-cycles of the power supply so that the entrained dust particles are given positive electrostatic charges, the charged dust depositing upon the oppositely charged plates 21.

Although in both Figs. 1 and 2, ionization only takes place during positive half-cycles, each dust particle moving through the ionization field is within this field for several half-cycles so that it is adequately charged.

Since the D. C. voltage between adjacent collector plates in both Figs. 1 and 2, the plates are more closely spaced than plates having 6 kv. applied thereto.

Another advantage of this invention is that short-circuiting of the collector plates as often happens in operation, removes 3 kv. from the ionizer so that ionization cannot take place. This prevents charged dust from passing through an inoperative collector cell and depositing upon room walls and draperies, etc., in the well known space charge, blackness effect.

What I claim, is:

1. An electrostatic precipitator comprising an ionizer wire, a plurality of collector plates, alternate ones of said plates being grounded and the other ones of said plates being insulated from said alternate plates, a pair of said alternate plates having portions on opposite sides of said wire and forming non-discharging ionizer electrodes, a step-up transformer having a secondary winding connected at one end to said wire and at the other end to the other ones of said plates, and a half-wave rectifier connected to a tap on said winding and to said alternate plates, said tap being closer to said other end than to said one end of said winding, and said rectifier being poled to supply direct current to said other plates during the half-cycles the voltage at said wire has the same polarity as said direct current.

2. An electrostatic precipitator comprising an ionizer wire, a plurality of collector plates, alternate ones of said plates being grounded and the other ones of said plates being insulated from said alternate plates, non-discharging ionizer electrodes on opposite sides of said wire and connected to said alternate plates, a step-up transformer having a secondary winding connected at one end to said wire and at the other end to said other ones of said plates, and a half-wave rectifier connected to a tap on said winding and to said alternate plates, said tap being closer to said other end of said winding than to said one end of said winding, and said rectifier being poled to supply direct current to said other plates during the half-cycles the voltage at said wire has the same polarity as said direct current.

References Cited in the file of this patent

UNITED STATES PATENTS

| | | |
|---|---|---|
| 2,008,246 | Deutsch | July 16, 1935 |
| 2,251,451 | Heinrich | Aug. 5, 1941 |
| 2,542,035 | Klemperer | Feb. 20, 1951 |